Dec. 13, 1932.     W. BARR     1,890,896
LOCKABLE REGULATING DEVICE
Filed Jan. 22, 1932     2 Sheets-Sheet 1
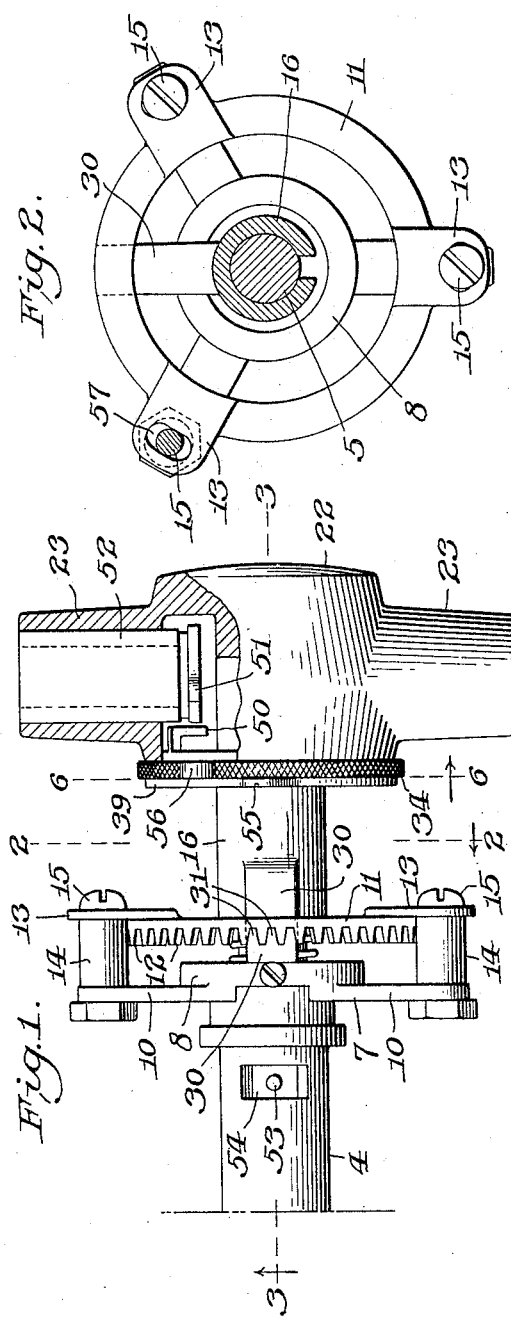
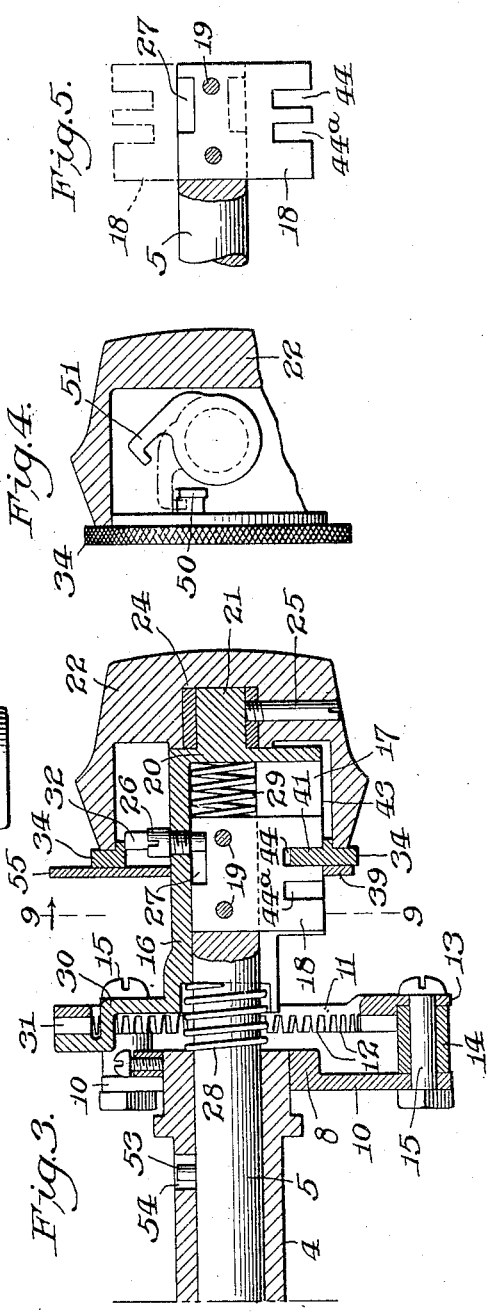
Inventor:
William Barr,
By A. V. Groupe
Attorney

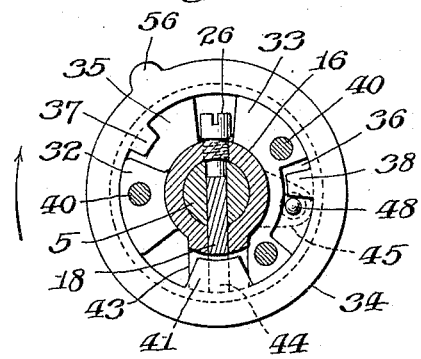
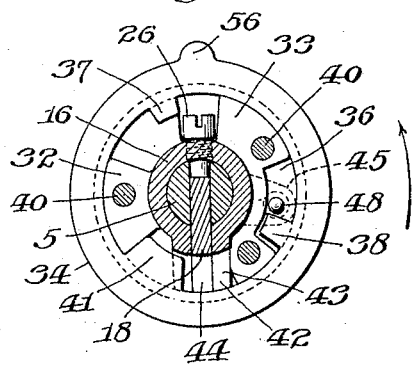
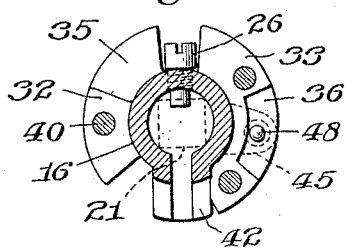
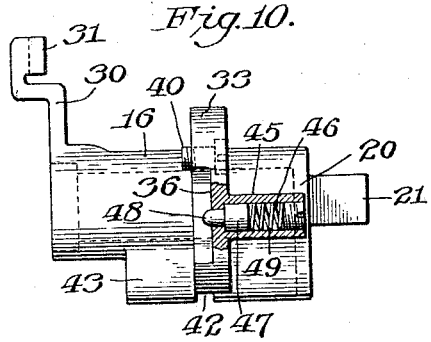
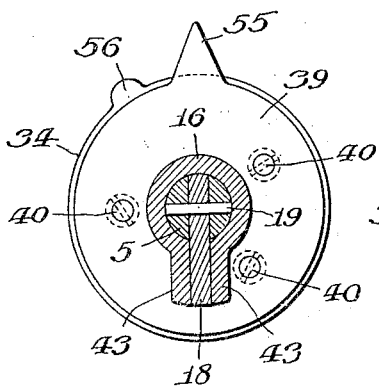
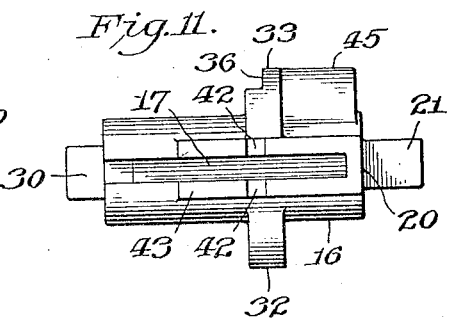

Patented Dec. 13, 1932

1,890,896

UNITED STATES PATENT OFFICE

WILLIAM BARR, OF PHILADELPHIA, PENNSYLVANIA

LOCKABLE REGULATING DEVICE

Application filed January 22, 1932. Serial No. 588,081.

This invention relates to improvements in lockable regulating devices adapted for use in connection with valves of various kinds, rheostats and similar devices wherein it is desirable to prevent accidental or willful meddling by unauthorized persons and wherein the parts may be locked by a key controlled part against any movement or adjustment whatsoever.

The invention is particularly, though not exclusively adapted for use in connection with the gas valves of gas ranges as providing a means for preventing children and other irresponsible persons from either turning the gas on or off or moving the valves from any adjusted positions in which they have been set to control the flow of gas to the burners of the range.

An object of the invention is to provide a novel, simple and efficient means to prevent a shaft or stem from being turned, after it has been set in a position of adjustment, by the usual handle provided for turning it, without first changing the position of a controlling or locking member set in a position to prevent the operation of the handle.

Another object of this invention is to provide a means whereby the said controlling or locking member may be locked against movement by a part which may be locked in a set position by a removable key, so that no one but the person having the removable key will be able to change the setting of the device.

A further object of the invention is to provide a novel device in which the parts thereof, when set in one position, will permit the said shaft or stem to be turned by merely turning the operating handle of the device, and in which the parts thereof, when set in another position, will require the handle to be moved longitudinally or pressed inwardly from its normal position before it may be operated to turn the shaft or stem.

This invention resides in the elements and the combinations of them hereinafter described and claimed.

In the accompanying drawings, illustrating the invention,

Figure 1 is a top view, partly broken away, of a lockable regulating device embodying my invention.

Figure 2 is a transverse section of the device, on line 2—2 of Fig. 1.

Figure 3 is a longitudinal section of the device, on line 3—3 of Fig. 1.

Figure 4 is a sectional detail showing the relation of the locking ring to the key controlled locking part.

Figure 5 is a sectional detail showing one end portion of the shaft or stem and its key.

Figure 6 is a transverse section of the device, on line 6—6 of Fig. 1.

Figure 7 is a view similar to Fig. 6, showing the locking ring in a different position.

Figure 8 is a view similar to Figure 6, after the removal therefrom of the locking ring and the shaft or stem and its key.

Figure 9 is a transverse section of the device, on line 9—9 of Fig. 3.

Figure 10 is a side view, partly in section of the sleeve of the operating handle and certain parts carried thereby.

Figure 11 is a bottom view of the sleeve shown in Fig. 10.

Referring to the drawings, 4 designates a support which may be part of the fixed frame or casing of the valve, rheostat or other device to which the invention is applied. Mounted to turn in this support 4 is a shaft or stem 5 which extends outwardly therefrom and which may be the operating part of the valve, rheostat, etc., adapted to be turned to different positions of adjustment.

One end portion of the support 4 surrounding the shaft 5 is of annular form and has a bracket 7 mounted thereon and comprising a collar 8 surrounding the same and secured thereto by suitable set screws, and arms 10 projecting radially from the collar. This bracket 7 supports a ring 11 which surrounds the outwardly extending portion of the shaft 5 and which is provided with an annular series of equally spaced teeth 12 directed toward the bracket 7, as shown. The ring 11 is provided with radially extending arms 13 in alinement with the arms 10 of the bracket 7, and spaced therefrom by interposed sleeves 14. The arms 10 and 13 are secured together by bolts 15 which extend through the same and through the interposed sleeves 14, thereby firmly securing the ring 11 to the bracket 7 in a manner to provide a clearance space between the teeth 12 and the arms 10 of the bracket for a purpose hereinafter explained.

A sleeve 16 is provided which is fitted to slide longitudinally on the outwardly extending end portion of the shaft 5 and which is provided with a longitudinally extending slot or keyway 17 formed between projecting walls or flanges 43 on the sleeve to receive a plate-like key 18 which projects from the shaft 5. The key 18 is seated in a slot in the outer end portion of the shaft 5 and it is held in place therein by removable pins 19 which extend transversely through the shaft and key. This key 18 permits the sleeve 16 to slide longitudinally on the shaft 5 and causes the shaft 5 to be turned by and with the sleeve 16 when it is turned.

The outer end portion of the sleeve 16 projects outwardly beyond the outer end of the shaft 5 and has an end wall 20 closing the outer end thereof. This end wall 20 is provided with a projection 21 which extends outwardly therefrom in axial alinement with the shaft 5 and carries an operating handle 22 having projecting arms 23 and which may be of any desired shape for its intended purpose. The projection 21 is made square in cross section and it is surrounded by a similarly shaped bushing 24 seated in the handle, whereby the sleeve 16 will be caused to be turned by and with the handle 22. The handle 22 is held in place upon the projection 21 by a suitable removable screw 25 which extends through one side of the handle 22 and is screwed into and through one side of the bushing and engages one side of the projection 21.

It will now be understood that the handle 22 and sleeve 16 form, in effect, a single part which may be moved longitudinally on the shaft 5 or turned to effect the turning of the shaft.

The sleeve 16 is provided with a stop screw 26, the inner end portion of which extends into a slot 27 formed in the key 18. This screw 26 is adapted to engage the outer end of the slot 27 to limit the outward movement of the handle 22 and sleeve 16 on the shaft 5 to an outer position, and to engage the inner end of the slot 27 to limit the inward movement of the handle 22 and sleeve 16 on the shaft 5 to an inner position.

Interposed between the inner end of the sleeve 16 and the support 4 is a spring 28 which surrounds the shaft 5, and interposed between the outer end of the shaft 5 and the end wall 20 of the sleeve 16 is a spring 29 which is housed within the sleeve 16. These two springs 28 and 29 urge the handle 22 and sleeve 16 outwardly toward their outer position in which the stop screw 26 is in engagement with the outer end wall of the slot 27 as shown in Fig. 3. The employment of the two springs 28 and 29, as above described, distributes the inward pressure thereof between the support or casing 4 and the shaft 5.

The inner end portion of the sleeve 16 is provided with an arm 30 which is shaped as clearly shown in Figs. 1, 2 and 10, and whose free end portion extends into the clearance space between the bracket arms 10 and the teeth of the fixed ring 11. The free end portion of the arm 30 is provided with one or several teeth 31 adapted to engage the teeth 12 of the ring 11, when the sleeve 16 and handle 22 are in the outer position, and thereby prevent the turning of the shaft 5 in any position of turning adjustment within a complete revolution thereof.

The longitudinal movement of the handle 22 and sleeve 16 as limited by the stop screw 26 is such that, when the handle is moved to the inner position, the teeth of the arm 30 will be freed from the teeth of the ring 11 to permit the handle 22 to turn the shaft 5, and that, when the handle is moved to the outer position, the teeth 31 will engage the teeth 12 and prevent the handle and shaft 5 from being turned.

The sleeve 16 has flanges 32 and 33 formed thereon and having peripheral bearing surfaces concentric with the shaft 5 and on which a locking ring or member 34 is fitted to be turned or rotated. These flanges 32 and 33 are provided with off-set or depressed portions 35 and 36, and the ring 34 is provided with projections 37 and 38 which extend inwardly therefrom and into the depressed portions 35 and 36, respectively. The surface of the projections 37 and 38 which face the handle 22 are adapted to engage the opposing surfaces of the walls of the depressions 35 and 36 and thereby prevent forward or outward displacement of the ring 34, and the ring is retained in place and inward displacement thereof prevented by a plate 39 which surrounds the sleeve 16 and shaft 5 and is secured to the flanges 32 and 33 by means of screws 40. The ring 34, flanges 32 and 33 and plate 39 are so related that when the screws 40 are tightened the plate 39 will press against the opposing surface of the ring 34 with sufficient force to prevent the accidental turning thereof from a set position and yet permit it to be turned by hand when it is desired to do so.

The locking ring 34 is provided with an inwardly extending, plate-like projection 41 which is adapted to be moved through slots or openings 42 in the walls or flanges 43 of the sleeve 16 and also to be moved into and from either of two slots or openings 44 and 44ª in the key 18. These key openings 44 and 44ª are spaced apart longitudinally of the sleeve 16 and shaft 5 and they are so located with respect to the locking ring projection 41 that, when the handle 22 and its sleeve are in the outer position, as shown in Figs. 1, 3 and 6, the projection 41 will be in registry with the opening 44 and may be moved into and from the same by turning the ring 34, and that when the handle 22 and sleeve 16 are in the inner position, the projection 41 will be in registry with opening 44ᵃ and may be moved into and from the same.

The locking ring 34 is adapted to be turned in the direction of the arrow in Fig. 6 from the position there shown to the position shown in Fig. 7, and also to be turned in the reverse direction indicated by the arrow in Fig. 7, from the position there shown to the position shown in Fig. 6. The projection 41 is adapted to engage the opposing edge of the flange 33 and limit the turning movement of the ring 34 when it is turned to the position shown in Fig. 6, and to engage the opposing edge of the flange 32 and limit the movement of the ring 34 when it is turned to the position shown in Fig. 7.

It will now be understood that when the locking ring 34 is in the position shown in Fig. 7, which is the unlocked position thereof, the handle 22 and its sleeve 16 will be free to be moved longitudinally back and forth between the inner and outer positions thereof previously described; and it will also be understood that when the handle and its sleeve are in the outer position, as shown in Fig. 3, the ring 34 may be turned to the position shown in Fig. 6, which is the locked position thereof, to cause the projection 41 to enter the outer opening 44 in the key 18 and thereby lock the handle and sleeve in the outer position, and also that when the handle and sleeve are in the inner position, the ring 34 may be turned to cause the projection 41 to enter the inner opening 44ᵃ in the key 18 and thereby lock the handle and sleeve in the inner position.

Referring now to Figs. 6, 7, 10 and 11, the sleeve 16 is provided with a lateral extension 45 located within the hollow handle 22. This extension 45 has a bore 46 therein provided with a reduced inner end portion and in which a pin 47 is slidably fitted. The pin 47 has a reduced inner end portion 48 which projects a slight distance into the depression 36 in the flange 33 between the two positions occupied by the locking ring projection 38 when the ring is in the locked and unlocked positions, shown in Figs. 6 and 7, respectively. The pin 47 is urged toward the depression 36 by a spring 49 within the bore 46 between the pin 47 and a plug or screw screwed into the outer end of bore. The free end of the reduced portion 48 of the pin 47 is made rounded so that when the projection 38 is moved from side to side thereof it will press the reduced end 48 of the pin out of its path against the action of the spring 49 until the projection clears the pin, whereupon the spring will return the reduced end portion thereof to the depression 36 and it, in addition to the friction of the retaining plate 39 will prevent accidental movement of the ring 34 from either the locked or unlocked position in accordance with the position of the projection 38 with respect to the pin.

Referring now to Figs. 1 and 4, the locking ring 34 is provided with an angular projection 50 which extends into one side of the hollow handle 22. This projection 50 is adapted to be engaged by the hook-like free end of an arm 51 which projects from the inner end of a shaft which is fitted to be turned in a cylindrical casing 52 secured in one of the projecting arms 23 of the handle 22. The casing 52 is provided to contain a suitable locking mechanism operated by a removable key for turning the arm 51 from the unlocked position shown by full lines in Fig. 4 to the locked position shown by dot-and-dash lines therein.

When the locking ring 34 is turned to the locking position, shown in Fig. 6, and the arm 51 is in the locked position shown by dot-and-dash lines in Fig. 4, the arm 51 will prevent the ring 34 from being moved from the locked position by the engagement of the arm 51 with the projection 50, and when the arm 51 is turned to the unlocked position, shown by full lines in Fig. 4, it will clear the projection 50 and leave the ring 34 free to be moved from its locking position.

When the invention is used in connection with the stem or shaft of a gas valve of a gas range, the shaft 5, representing such stem, will be provided with a stop pin 53 projecting therefrom and into a slot 54 in the surrounding frame or casing 4 and the ends of the slot 54 will limit the turning movements of the shaft in both directions, one end of the slot limiting the turning movement when the shaft is turned in one direction to open the valve and the other end of the slot limiting the turning movement when the shaft is turned in the reverse direction to close the valve.

The general operation of the device briefly described, is as follows:

When the handle 22 is in the inner position and the locking ring projection 41 is in the inner key opening 44ᵃ to maintain the handle 22 in the inner position, the teeth 31 of the arm 30 are free from engagement with the teeth 12 of the ring 11 and the handle 22 is free to turn the shaft 5 as desired.

When the handle 22 is in the outer position and the locking ring 34 is in the unlocked position, shown in Fig. 7, it is necessary to move the handle 22 inwardly to the inner position against the action of the springs 28 and 29 to free the teeth of the arm 30 from the teeth of the ring 11 to permit the handle to turn the shaft 5 to any desired position.

After the shaft 5 has been thus turned and the handle 22 released, the springs 28 and 29 will automatically return the handle to the outer position and thereby move the teeth 31 of the arm 30 into engagement with the teeth 12 of the ring 11 and thus prevent the turning of the shaft from the position to which it was adjusted.

When the handle 22 is in the outer position and the locking ring 34 is in the locking position, shown in Fig. 6, the location of the projection 41 within the key opening 44 will make it impossible for anyone to turn the shaft 5 without first turning the ring 34 to the unlocked position and thereafter pressing the handle 22 inwardly to the inner position.

When the handle 22 is in either the inner or outer position and the locking ring 34 is in the locking position and the arm 51 has been turned to the position shown by dot-and-dash lines in Fig. 4 it will prevent the locking ring 34 from being turned from its locking position and thereby prevent the release of the handle 22 and sleeve 16 for either inward or outward movement, as the case may be, so that a person holding the key for controlling the arm 51 will be the only one who will be able to change the setting of the parts as controlled by the ring 34.

The retaining plate 39 is provided with an upwardly extending projection 55 and the locking ring 34 is provided with an outwardly extending projection 56 which moves into registry with the projection 55 when the ring 34 is moved to the unlocking position and which moves out of registry therewith when the ring 34 is moved to the locking position, thereby indicating that the ring is in either the locked or the unlocked position. The projection 55 also indicates the position of the shaft 5 and the valve or other device operated thereby.

The arms 13 of the toothed ring 11 are provided with slots 57, Fig. 2, concentric with the ring and through which the bolts 15 which hold the ring in place extend. The purpose of these slots 57 is to permit circular adjustment of the ring 11 within certain limits to permit a fine adjustment thereof with relation to any particular point in the turning adjustment of the shaft 5 wherein it is desired that the teeth 31 of the arm 30 shall come into proper registry with the teeth 12 of the ring 11 to lock the shaft at that point.

If, for any reason it should be desired to turn the support 4 and the parts carried thereby and the shaft 5 therein a half revolution, or upside down, within relation to the handle 22 and its sleeve 16 and the indicators 55 and 56, the same may be done by removing the sleeve 16 and parts carried thereby from the shaft 5 and then removing the pins 19 and reversing the key 18, as shown by dot-and-dash lines in Fig. 5, and then replacing the pins 19. This done, the sleeve 16 and parts carried thereby may be reassembled on the shaft 5 without changing the upwardly directed positions of the indicators 55 and 56.

When the arm 51 is in the position shown by dot-and-dash lines in Fig. 4, engaging the projection 50, as previously explained, the hook-like free end of the arm 51 will prevent the handle 22 from being removed from the projection 50 even though the screw 25 be removed from the handle 22; and the square projection 21 will prevent the handle 22 from being turned to free the hook-like end of the arm 51 from the angular projection 50 sufficiently to permit the handle 22 to be withdrawn from the sleeve 16. Thus it will be impossible to tamper with the device when the arm 51 is in the locking position.

I claim as my invention:

1. The combination of a support, a shaft fitted to turn therein, an operating handle keyed on the shaft and slidable longitudinally thereon to either of two positions, said handle being free to turn the shaft when the handle is in one of said positions, means to prevent the handle from turning from any one of a plurality of adjusted positions when the handle is in the other of said two positions, and a locking member movable into and from a locking position and provided with means to prevent longitudinal movement of the handle from the last named position when said member is in the locking position.

2. The combination of a support, a shaft fitted to turn therein, an operating handle keyed on the shaft and slidable longitudinally thereon to either of two positions, means to prevent the handle from turning from any one of a plurality of adjusted positions when the handle is in the other of said two positions, said handle being free to turn the shaft when the handle is in one of said positions, and a locking member movable into and from a locking position and provided with means to prevent longitudinal movement of the handle from the last named position when said member is in the locking position.

3. The combination of a support, a shaft fitted to turn therein, an operating handle keyed on the shaft and slidable longitudinally thereon to either of two positions, said handle being free to turn the shaft when the handle is in one of said positions, means to prevent the handle from turning when the handle is in the other of said positions, and a locking member carried by the handle and movable relatively thereto into and from a locking position, said shaft having parts adapted to be engaged by said member when in the locking position to prevent longitudinal movement of the handle from either of said positions.

4. The combination of a support, a shaft fitted to turn therein, an operating handle keyed on the shaft and slidable longitudinally thereon to either of two positions, said handle being free to turn the shaft when the handle is in one of said positions, means to prevent the handle from turning from any one of a plurality of adjusted positions when the handle is in the other of said two positions, and a spring urging the handle toward the last named position.

5. The combination of a support, a shaft fitted to turn therein, an operating handle keyed on the shaft and slidable longitudinally thereon to either of two positions, said handle being free to turn the shaft when the handle is in one of said positions, a toothed member mounted on the support, and a toothed arm carried by the handle and adapted to engage said member to prevent the turning of the handle in different positions of turning adjustment thereof when the handle is moved longitudinally to the other of said positions.

6. The combination of a support, a shaft fitted to turn therein, an operating handle keyed on the shaft and slidable longitudinally thereon to either of two positions, said handle being free to turn the shaft when the handle is in one of said positions, a toothed member mounted on the support, a toothed arm carried by the handle and adapted to engage said member to prevent the turning of the handle in different positions of turning adjustment thereof when the handle is moved longitudinally to the other of said positions, and a spring urging the handle toward the last named position.

7. The combination of a support, a shaft fitted to turn therein, an operating handle keyed on the shaft and slidable longitudinally thereon to either of two positions, said handle being free to turn the shaft when the handle is in one of said positions, means to prevent the handle from turning from any one of a plurality of adjusted positions when the handle is in the other of said two positions, a locking member movable into and from a locking position and provided with means to prevent longitudinal movement of the handle from the last named position when said member is in the locking position, and a spring urging the handle toward the last named position.

8. The combination of a support, a shaft fitted to turn therein, an operating handle keyed on the shaft and slidable longitudinally thereon to either of two positions, said handle being free to turn the shaft when the handle is in one of said positions, a toothed member mounted on the support, a toothed arm carried by the handle and adapted to engage said member to prevent the turning of the handle in different positions of turning adjustment thereof when the handle is moved longitudinally to the other of said positions, and a locking member movable into and from a locking position and provided with means to prevent longitudinal movement of the handle from the last named position when said member is in the locking position.

9. The combination of a support, a shaft fitted to turn therein, an operating handle keyed on the shaft and slidable longitudinally thereon to either of two positions, said handle being free to turn the shaft when the handle is in one of said positions, a toothed member mounted on the support, and a toothed arm carried by the handle and adapted to engage said member to prevent the turning of the handle in different positions of turning adjustment thereof when the handle is moved longitudinally to the other of said positions, a locking member movable into and from a locking position and provided with means to prevent longitudinal movement of the handle from the last named position when said member is in the locking position, and a spring urging the handle toward the last named position.

10. The combination of a support, a shaft fitted to turn therein and having a key extending therefrom and having two openings therein spaced longitudinally of the shaft, an operating handle having a sleeve secured thereto and slidable longitudinally on the shaft to either of two positions and having a longitudinally extending key way therein into which the key extends, said sleeve being free to turn the shaft when the sleeve is in one of said positions, means to prevent the sleeve from turning when the sleeve is in the other of said positions, and a locking member carried by the sleeve and movable into and from either of said openings to prevent longitudinal movement of the sleeve when it is in either of said positions.

11. The combination of a support, a shaft fitted to turn therein and having a key extending therefrom and having two openings therein spaced longitudinally of the shaft, an operating handle having a sleeve secured thereto and slidable longitudinally on the shaft to either of two positions and having a longitudinally extending key way therein into which the key extends, said sleeve being free to turn the shaft when the sleeve is in one of said positions, means to prevent the sleeve from turning when the sleeve is in the other of said positions, and a locking ring rotatably mounted on the sleeve and having a projection adapted to enter either of said openings when in registry therewith to prevent longitudinal movement of the sleeve from either of said positions.

12. The combination of a support, a shaft fitted to turn therein and having a key extending therefrom and having two openings therein spaced longitudinally of the shaft, an operating handle having a sleeve secured thereto and slidable longitudinally on the shaft to an inner position and to an outer position and having a longitudinally extending key way therein into which the key extends, said sleeve being free to turn the shaft when said sleeve is in the inner position, means to prevent the sleeve from turning when the sleeve is in the outer position, a locking ring rotatably mounted on the sleeve and having a projection adapted to enter one of said openings and prevent longitudinal movement of the sleeve when in the inner position and to enter the other of said openings and prevent longitudinal movement of the sleeve when in the outer position, and a spring urging the sleeve toward the outer position.

13. The combination of a support, a shaft fitted to turn therein and having a key extending therefrom and having two openings therein spaced longitudinally of the shaft, an operating handle having a sleeve secured thereto and slidable longitudinally on the shaft to an inner position and to an outer position and having a longitudinally extending key way therein into which the key extends, said sleeve being free to turn the shaft when said sleeve is in the inner position, a toothed member mounted on the support, a toothed arm carried by the sleeve and adapted to engage said member to prevent the turning of the sleeve in different positions of turning adjustment thereof when the sleeve is moved to the outer position, a locking ring rotatably mounted on the sleeve and having a projection adapted to enter one of said openings and prevent longitudinal movement of the sleeve when in the inner position and to enter the other of said openings and prevent longitudinal movement of the sleeve when in the outer position, and a spring urging the sleeve toward the outer position.

14. The combination of a support, a shaft fitted to turn therein, an operating handle keyed on the shaft and slidable longitudinally thereon to either of two positions, said handle being free to turn the shaft when the handle is in one of said positions, a toothed ring surrounding the shaft, a bracket mounted on the support and supporting said ring, and a toothed arm carried by the handle and adapted to engage said ring to prevent the turning of the handle in different positions of turning adjustment thereof when the handle is moved longitudinally to the other of said positions.

15. The combination of a support, a shaft fitted to turn therein, a sleeve keyed on the shaft and slidable longitudinally thereon to an inner position and to an outer position and having a projection extending outwardly from the outer end thereof in axial alinement with the shaft, a handle secured upon said projection, said sleeve being free to turn the shaft when the sleeve is in the inner position, and means to prevent the sleeve from turning from any one of a plurality of adjusted positions when the sleeve is in the outer position.

16. The combination of a support, a shaft fitted to turn therein, a sleeve keyed on the shaft and slidable longitudinally thereon to an inner position and to an outer position and having an outer end wall opposite to the outer end of the shaft, said end wall having a projection extending outwardly therefrom in axial alinement with the shaft, a handle secured upon said projection, said sleeve being free to turn the shaft when the sleeve is in the inner position, means to prevent the sleeve from turning when the sleeve is in the outer position, and a spring within the sleeve between said end wall and the end of the shaft and urging the sleeve toward the outer position.

17. The combination of a support, a shaft fitted to turn therein and having a key extending therefrom and having two openings therein spaced longitudinally of the shaft, an operating handle having a sleeve secured thereto and slidable longitudinally on the shaft to an inner position and to an outer position and having a longitudinally extending key way therein into which the key extends, said sleeve being free to turn the shaft when said sleeve is in the inner position, means to prevent the sleeve from turning when the sleeve is in the outer position, a locking ring rotatably mounted on the sleeve and having a projection adapted to enter one of said openings and prevent longitudinal movement of the sleeve when in the inner position and to enter the other of said openings and prevent longitudinal movement of the sleeve when in the outer position, and means movable into and from a position preventing movement of said ring when its projection is in either of said openings and preventing longitudinal movement of the sleeve.

18. The combination of a support, a shaft fitted to turn therein, a sleeve keyed on the shaft and slidable longitudinally thereon to an inner position and to an outer position and having an outer end wall opposite to the outer end of the shaft, said end wall having a projection extending outwardly therefrom in axial alinement with the shaft, a handle secured upon said projection, said sleeve being free to turn the shaft when the sleeve is in the inner position, means to prevent the sleeve from turning when the sleeve is in the outer position, a spring within the sleeve between said end wall and the end of the shaft, and a spring encircling the shaft between the sleeve and the support, said springs urging the sleeve toward the outer position.

19. The combination of a support, a shaft fitted to turn therein, a sleeve keyed on the shaft and slidable longitudinally thereon to an inner position and to an outer position, a handle secured to said sleeve, said sleeve being free to turn when it is in one of said positions, means to prevent the sleeve from turning when it is in the other of said positions, and a holding member rotatably mounted on the sleeve and movable into and from a holding position and provided with means to prevent longitudinal movement of the sleeve from the last named position when the member is in the holding position.

In testimony whereof, I affix my signature.

WILLIAM BARR.